United States Patent
Defrance et al.

(10) Patent No.: US 7,577,339 B2
(45) Date of Patent: Aug. 18, 2009

(54) METHOD AND DEVICE FOR READING MPEG RECORDED DATA TRANSMITTED ON AN IEEE 1394 BUS

(75) Inventors: Serge Defrance, Rennes (FR); Jean-Charles Guillemot, Thorigne Fouillard (FR); Olivier Marlec, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 1198 days.

(21) Appl. No.: 10/332,428

(22) PCT Filed: Jul. 16, 2001

(86) PCT No.: PCT/FR01/02295

§ 371 (c)(1),
(2), (4) Date: Jan. 7, 2003

(87) PCT Pub. No.: WO02/07436

PCT Pub. Date: Jan. 24, 2002

(65) Prior Publication Data

US 2004/0042767 A1   Mar. 4, 2004

(30) Foreign Application Priority Data

Jul. 17, 2000   (FR) .................................. 00 09306

(51) Int. Cl.
*H04N 7/26* (2006.01)
*H04N 5/91* (2006.01)
(52) U.S. Cl. ......................................... 386/124; 386/46

(58) Field of Classification Search .................... 386/46
See application file for complete search history.

(56) References Cited

U.S. PATENT DOCUMENTS

| 5,566,174 | A | * | 10/1996 | Sato et al. ................. 370/468 |
| 5,652,627 | A | * | 7/1997 | Allen ......................... 348/497 |
| 5,973,748 | A | * | 10/1999 | Horiguchi et al. ........... 348/554 |
| 6,556,590 | B1 | * | 4/2003 | Saeijs et al. ................. 370/504 |
| 6,650,719 | B1 | * | 11/2003 | Baker ........................ 375/371 |

FOREIGN PATENT DOCUMENTS

| EP | 0749244 | 12/1996 |
| EP | 1006729 | 6/2000 |

\* cited by examiner

*Primary Examiner*—Marsha D Banks Harold
*Assistant Examiner*—Oluwaseun A Adegeye
(74) *Attorney, Agent, or Firm*—Robert D. Shedd; Paul P. Kiel

(57) ABSTRACT

The process is characterized in that it comprises:
a step of reading tags recorded together with the packets, these tags defining the instants of arrival of the data packets to be recorded, on the basis of a tagging clock (8),
a step of comparing the tags with values counted (9) on the basis of a transfer clock (8) for determining the instants of transfer on the bus of the data read from the record carrier,
the frequencies of operation of the said tagging and transfer clocks being such that the maximum deviation between these frequencies, added to the maximum drift of the MPEG system clock, is, in proportion to the nominal values, of the order of or less than the drift of the system clock specified in the standard.

Figure 1:
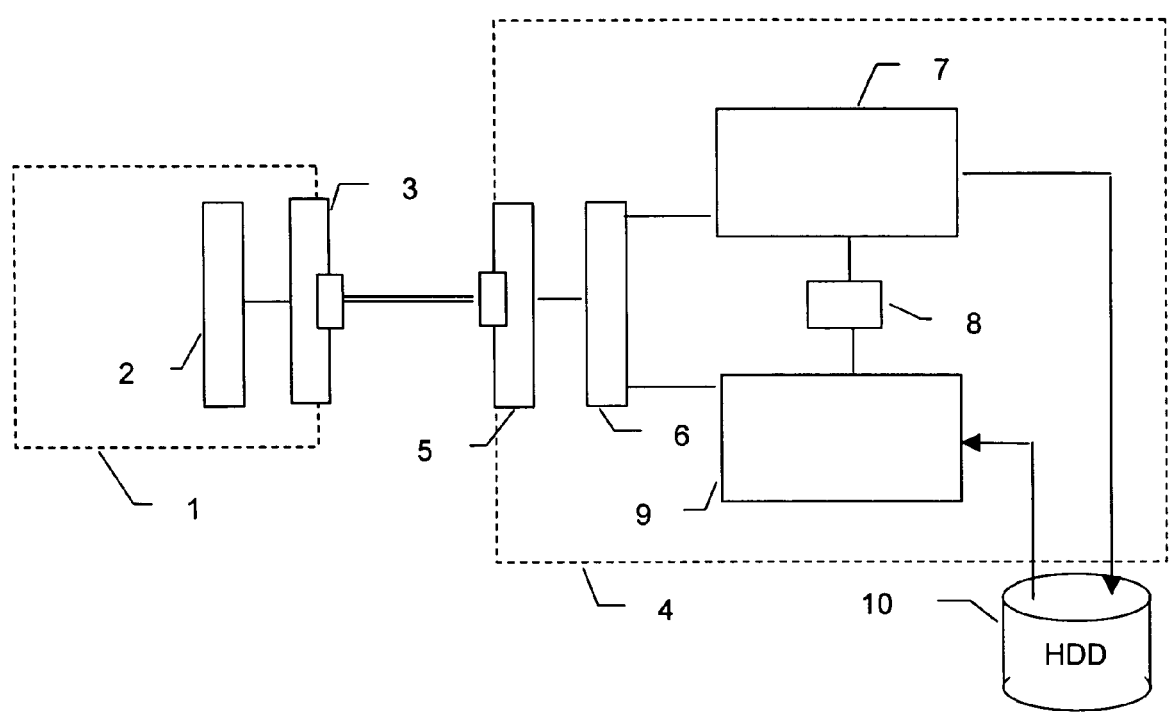

Application to the storage of MPEG data.

11 Claims, 2 Drawing Sheets

METHOD AND DEVICE FOR READING MPEG RECORDED DATA TRANSMITTED ON AN IEEE 1394 BUS

This application claims the benefit, under 35 U.S.C. § 365 of International Application PCT/FR01/02295, filed Jul. 16, 2001, which was published in accordance with PCT Article 21(2) on Jan. 24, 2002 in French and which claims the benefit of French patent application No. 00/09306 filed Jul. 17, 2000.

The invention relates to the recording and the reading of the recorded data coded according to the MPEG 2 standard or according to the DV standard, acronyms for the expressions Motion Picture Expert Group et Digital Video, transmitted on an IEEE 1394 bus. It pertains for example to the recording of DSS (standing for Digital Satellite System) data originating from a satellite receiver, of DV data originating from a digital camcorder etc., these data travelling over an IEEE 1394 bus for their recording or their decoding by a digital decoder.

The appearance of novel digital audiovisual equipment such as video recorder, camcorder, multimedia computer etc. is now making the use of a high-speed link between such equipment indispensible. Home-automation networks are constructed around a fast IEEE 1394 serial bus to which such equipment are subscribers.

A bus can comprise up to 63 participants called nodes, and up to 1023 buses can be deployed in one and the same system. Each node comprises three main functional components, a physical interface layer (called the PHYSICAL LAYER) which carries out the interfacing with the cable, the arbitration of the bus and an active repeater function, a link control layer (called the LINK LAYER) which assembles and disassembles the data packets and takes charge of the exchange procedures, a host controller which manages the higher layers of the communication protocol (called the TRANSACTION LAYER).

Several types of audio and video data, for example MPEG 2, DV, DSS etc. are exchanged over the 1394 bus, the subscribers being able to deal with these various standards.

The audio and video train data required to be transmitted in real time are exchanged in isochronous mode. A bus will incorporate a root node (as it is known in the standard), as well as a manager of isochronous resources and a bus manager, which will be defined during the bus initialization phase. The isochronous resources manager is responsible for allocating the isochronous resources (in terms of bandwidth) for the entire session, on the basis of elementary cycles of 125 microseconds on the bus. However, this does not make it possible to guarantee a low level of jitter such as may be required during the transmission of data, for example a TS transport train to an MPEG decoder, as recalled hereinbelow.

International standard ISO/IEC 13818-1 relating to the coding of audio and video data of MPEG 2 type, as far as systems are concerned, describes a synchronization model for the complete chain, that is to say as regards the coding, transmission, decoding and displaying of the MPEG type images. The recovery of the system clock, at the decoder level, is performed for example by locking, via a phase-locked loop, the values of the local clock to the reference clock values transported by the PCR of an incoming TS stream. The instant of arrival of the PCR field must not cause a drifting of the system clock such as reproduced in the decoder, of more than 30 ppm, the precision imposed by the ISO/IEC 13818-1 international standard.

An audiovisual layer has been defined so as to allow the receiver to compensate for the variations in transmission time which are introduced by the 1394 bus. It is specified by IEC standard 61883. A 12-byte header, in the case of MPEG 2 data, containing a "time marker" (also known as a time stamp) is appended to the data packets, packets consisting of 188 bytes in the case of this MPEG 2 standard.

Before transmission on the bus, at the input of the 1394 interface, the packets are marked or stamped, on the basis of the clock of the 1394 circuits whose precision, according to the standard, is 100 ppm. The audio video packets are stored in the FIFO memory of the 1394 interface, each packet receives a temporal sample, in fact a header, upon its arrival in the memory. This memory acquires a certain number of packets over the duration of 125 microseconds, depending on the bit rate at the input. When the 125-microsecond synchronization signal ("cycle start") is triggered, these packets are transmitted over the 1394 bus, following one another.

After receipt of the packets originating from the bus, at the output of the 1394 interface, the marker is read and compared with the content of a local counter so as to define what will be the instant of presentation of the packet. This temporal sample makes it possible to recreate the temporal distribution that existed at the input of the FIFO. The local counter is synchronized at each cycle start with the clock of the root node which generates the reference period of 125 microseconds.

In the case of a direct link, that is to say of a simple transfer via the 1394 bus, the deviation between the stamping instant and the instant of reading of the tag is of the order of a hundred microseconds or so. The writing or more precisely the tagging of the data as well as the reading of this tag are performed on the basis of different local clocks which are however simultaneously synchronized every 125 microseconds with the master clock of the root node. The writing and the reading being quasi-instantaneous, the effects due to jitter or drift intrinsic to the IEEE1394 bus synchronization mechanism and to the precision of its clock system do not therefore result in a drift in the distribution of the packets over time, at the output of the 1394 interface. Consequently, the 1394 bus does not modify the bit rate and this temporal marking according to the IEC 61883 standard resolves the problem of loss of temporal distribution of the MPEG 2 packets during transmission over the 1394 bus.

However, when a mass storage is associated with the audiovisual equipment, when the TS stream transmission chain is "cut", for example owing to a recording of the compressed data of this stream on a hard disk for subsequent reading by the decoder, this specific problem of drift persists when the data travel via the 1394 bus.

The use of tagging relating to the 1883 layer, for recording on the carrier, does not make it possible to resolve the problem owing to the precision of the 1394 synchronization clock, which is of the order of 100 ppm. The instant of stamping of the data is different from the instant of reading of these data from the hard disk. There is drift in the output bit rate of the 1394 interface owing to the new temporal distribution of the packets over time related to the alterations in the clock frequency.

It may also be remarked that the root node during recording may be different from that during reading. Consequently, the synchronization of the clock during tagging may be achieved with regard to a different master clock from that during the reading of the tag.

This drift in the bit rate and therefore in the instants of arrival of the PCRs to which the 27 Mhz local clock synchronizes causes a frequency drifting of this clock. Consequently, in the longer or shorter term, a drying up or an overflowing of the buffer of the MPEG decoder occurs resulting in a defect in the screening of the images on the receiver, for example an image freeze appears recurrently.

An overly large shifting of this synchronized clock may also impair the quality of the chrominance signals extracted from the subcarrier.

Modifying the 100 ppm precision of an item of equipment would not make it possible to resolve the problem since any item of equipment may be declared root node during the writing and then during the reading of the data of the hard disk.

Thus, if the compressed data are not transmitted directly to a decoder but are recorded on a record carrier, for example a hard disk, so as, subsequently, to be read, by way of a 1394 bus, by the decoder, problems of drifting persist, sooner or later causing in a recurrent manner a defect in the displaying of the images.

A known mode of operation called "pull" in which the bit rate for transferring data from the hard disk to the decoder can be "commanded" by the decoder, for example as a function of the degree of fill of the buffer of the decoder makes it possible to avoid any drying up or overflowing of this buffer. In this mode, the problems of clock precision are less crucial, an overly large drifting of the clock of the decoder, owing to a drift in the bit rate, being corrected by regulating the bit rate of the stream when reading, by the decoder, as a function of the fill level of the buffer of the decoder. This mode of operation is not however possible in the case of a TS stream recording which does not allow direct memory accesses (DMA) by the decoder. As far as the recording at the PES packet level is concerned, it does not allow the transferring of these data over the 1394 bus.

The aim of the invention is to alleviate the aforesaid drawbacks.

Its subject is a process for reading from a record carrier audio and video data coded in the form of packets according to the MPEG standard, for their transmission to a decoder by way of a bus, these packets having previously been recorded together with tags defining, on the basis of a tagging clock, instants of reception from the bus of the packets to be recorded, characterized in that it comprises:

a step of reading the tags recorded together with the packets, a step of comparing the tags with values counted on the basis of a transfer clock for determining the instants of transfer on the bus of the data read from the record carrier, the frequency of operation of the transfer clock being such that the maximum deviation between the frequencies of the tagging clock and of the transfer clock, added to the maximum drift of the MPEG system clock, is, in proportion to the nominal values, of the order of or less than the drift of the system clock specified in the standard.

According to a variant, the process is characterized in that the tagging clock and the transfer clock are one and the same clock and in that the frequency of operation is such that its maximum drift, added to the maximum drift of the system clock is, in proportion to the nominal values, of the order of or less than the drift of the system clock specified in the standard divided by two.

The subject of the invention is also a reading device for the implementation of the process comprising a record carrier and a reading interface circuit for the reading and the transferring of the data from the record carrier to a bus, characterized in that it comprises at least one transfer clock for transferring the data read, such that the maximum deviation between the frequency of the tagging clock and the frequency of the transfer clock, added to the maximum drift of the MPEG system clock, is, in proportion to the nominal values, of the order of or less than the drift of the system clock specified in the standard.

According to a variant, the device is characterized in that the tagging clock and the transfer clock are one and the same clock and in that its frequency of operation is such that its maximum drift, added to the maximum drift of the system clock is, in proportion to the nominal values, of the order of or less than the drift of the system clock specified in the standard divided by two.

By virtue of the stamping of the packets stored in the record carrier on the basis of a specific clock, the risks of drying up or of overflowing of the buffer of the decoder are reduced to the minimum.

The main advantage of the invention is that it allows perfect compatibility in respect of the storing and transferring of signals of DV or MPEG type through a 1394 bus.

Figure 2:
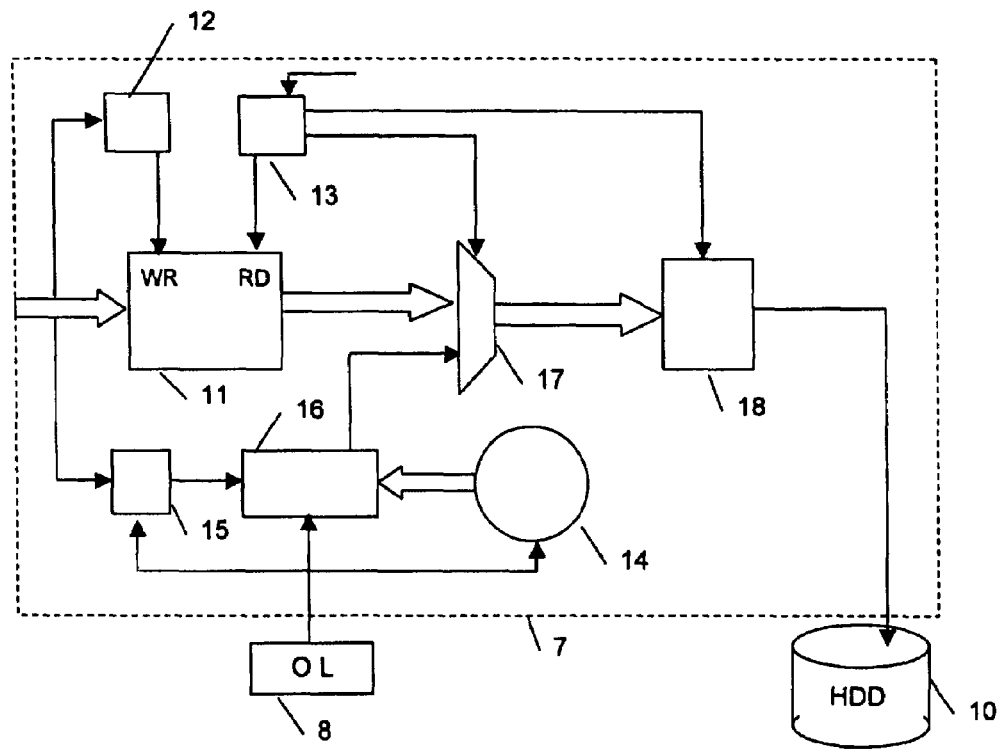
Figure 3:
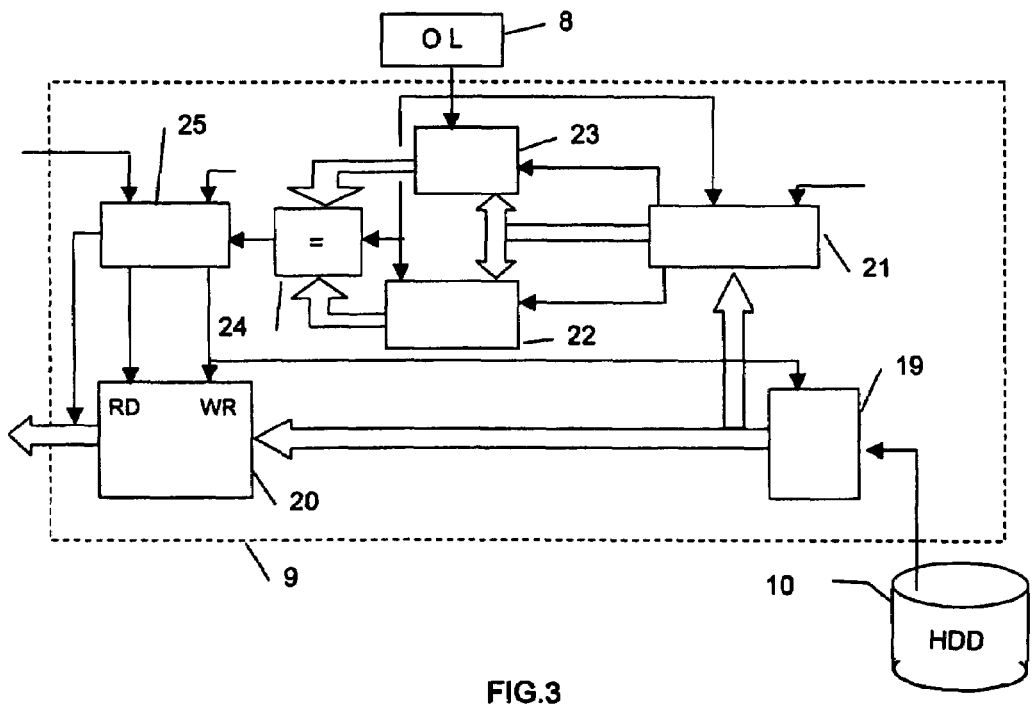

The characteristics and advantages of the present invention will become better apparent from the following description, given by way of example and with reference to the appended figures which represent:

FIG. 1, a receiver linked to a recording device,

FIG. 2, a write interface circuit,

FIG. 3, a read interface circuit.

A configuration of a device for recording compressed data on a record carrier linked to a satellite receiver through a 1394 bus is represented in FIG. 1. A receiver 1 equipped with a 1394 interface circuit receives a train of audiovideo data compressed according to the MPEG 2 standard originating from a satellite transmission, called the TS transport train in the standard (the acronym standing for Transport Stream). The signal received by the receiver is, among other things, demodulated so as to provide a baseband signal. This transport stream comprises several programmes. It may be transmitted as is or else after filtering selecting only the packets corresponding to a chosen programme.

A 1394 interface circuit incorporated into the receiver makes it possible to transmit this data stream over the 1394 link. This circuit consists, according to the nomenclature of the standard, of a "link control" layer (LINK) 2 and of a physical interface layer (PHY) 3. It makes it possible, among other things, to carry out the tagging of the packets according to the IEC 61883 standard. The data are transmitted by way of a 1394 port. The recording device 4 comprises a hard disk 10 and an interface circuit of the hard disk 4 linked to the 1394 bus and to the hard disk.

This interface circuit 4 comprises a PHI circuit 5, a LINK circuit 6, a write interface circuit 7, a read interface circuit 9 and a clock circuit 8.

The data arrive, by way of a 1394 port, on a PHY circuit 5 and a LINK circuit 6 in accordance with the 1394 standard. They are transmitted on the audiovideo output port of the LINK circuit at the instants corresponding to the tagging of the packets. The audiovideo port is linked to the input of a write interface circuit 7 which stamps the data in accordance with the invention. The hard disk interface circuit 4 is linked to a hard disk 10. It transmits the stamped data to the hard disk for their recording.

The hard disk 10 is linked to an input of the interface circuit 4 for the reading of the data. A read interface circuit 9 will read the data on this input so as to transmit them to the input audiovideo port of the PHI circuit 6. These data are then sent to the 1394 bus via the PHY circuit 5 and the 1394 port.

A clock 8 feeds each of the interface circuits 7 and 9.

Writing of the Data

The write interface circuit 7 is now described in greater detail with the aid of FIG. 2.

The audio and video data accompanied by validation and packet start signals and by a 10 Mhz synchronization clock originating from the audiovideo output port of the LINK circuit 6 are present at the input of the write interface circuit 7. The data are stored in a packet memory 11. The clock signal increments a write counter 12 which commands the writing to the packet memory 11. The packet start signal allows the resetting of this counter 12 to zero. A read counter 13 commands the reading of the packet memory 11, synchronizes a multiplexer 17 and controls the writing to a buffer memory 18 for the transmission and recording of the data. On an input, this counter 13 receives an information item regarding the length of the packets, namely 188 bytes in the case of MPEG 2 type data, 131 bytes in the case of DSS type data and 480 bytes in the case of DV type data.

The packet memory has the role of ensuring that the data received are whole packets and, if not, of transmitting packets with the right length, by appending padding bits.

The stamping of the data according to the invention is achieved on the basis of a specific clock which is a high frequency oscillator 8, for example at the frequency of 40 Mhz and whose conditions of stability over time are specified between 1 ppm and 15 ppm as will be explained later. This oscillator is linked to the clock input of a counter 14. It is also linked to a packet start detection circuit 15 and a capture register 16 of the temporal marker, for the synchronization of these circuits. The counter 14 is paced by the clock 8 and transmits the counting words to the register 16. When the packet start signal, which is transmitted to the packet start detection circuit 15, is received, this circuit transmits a validation signal, synchronized with the clock 8, to the register 16 which stores the counter output at this instant. The detection circuit 15 makes it possible to retrieve the start of a packet in the case where this signal is not otherwise transmitted and to sample it so as to render it synchronous with the high frequency clock 8. The value stored by the register 16 is transmitted to a multiplexer 17 which also receives the data output by the packet memory 11. The read counter 13 commands the multiplexer which transmits at its output, first of all the tag corresponding to the instant of arrival of the packet start in the packet memory and then the data of this stored packet. These data pass through a recording buffer memory 18 before being transmitted on the output of the interface 7 for their storage, in the form of an audiovideo file, by the hard disk 10 linked to this output.

Reading of the Data

The interface circuit 9 is now described in greater detail with the aid of FIG. 3.

The hard disk 10 is linked to an input of the read interface circuit 9 to provide the recorded data. These data at the input of this circuit travel via a read buffer memory 19, then are transmitted to a packet memory 20 and a tag extraction circuit 21. The audiovideo data originating from the hard disk are recorded in the packet memory 20 whereas the tagging data are extracted so as to be stored by the tag extraction circuit 21. These tagging data are those appended to the audiovideo data by the circuit 7, for each packet, as indicated above. The information item relating to the length of a packet is transmitted to the extraction circuit 21, the tag to be extracted being received at the packet rate.

The extraction circuit 21 transmits the tags to a restoration counter 23 and to a register for storing the temporal tag 22, in synchronization with the clock 8 received by the circuit. It also transmits a loading command signal to the restoration counter upon the opening of the file, this counter then loading the first temporal tag read during the opening of the file so as to initialize itself. It also transmits a data consideration signal to the storage register 22, during the dispatching of an extracted temporal tag. The tag is then loaded by the register in synchronization with the clock signal 8 also received by this register.

The clock input of the counter 23 receives the signals of the clock 8. The output of the counter 23 is transmitted to a comparator 24 which on a second input, originating from the storage register 22, receives the temporal tag of the packet which is undergoing storage in the packet memory 20. Upon equality, and synchronized with the clock signal 8 received by the circuit, a read command signal is transmitted by the comparator 24 to a packet counter 25. On receipt of this signal, the counter triggers the reading of a number of bytes corresponding to a packet. This packet counter receives the information item relating to the length of a packet. During the reading of the data of the packet memory 20, the counter 25 actuates the reading of a new packet of the read buffer memory 19 and the writing of this packet to the packet memory 20. The clock input of the packet counter is fed by the audiovideo clock signal originating from the LINK interface 6 so as to synchronize the transmission of the data. The audiovideo data originating from the packet memory 20 as well as the corresponding valid clock signals, packet start signals and data originating from the packet counter 25 are supplied at the output of the interface circuit 9.

Thus, the restoration counter 23 is initialized with the tag of the first packet read from the file of the hard disk. In the transient phase, the first packet is stored in the packet memory and read immediately, hence transmitted immediately to the audiovideo input port of the LINK circuit 6. After storage followed by immediate transmission of the first packet, the tag of the second packet is extracted and loaded into the register 22 while the second packet is stored in the packet memory. The counter 23 runs at the frequency of the precision clock 8 and when the counting value is equal to the value of the second tag, the comparator 24 transmits a signal for triggering the packet counter 25 for the reading and the transmission to the audiovideo input port of the LINK circuit 6 of the number of bytes corresponding to a packet. And so on and so forth for each reading of a new packet.

The packet counters' synchronization clocks are transmitted by the audiovideo port of the LINK circuit. The could equally well be constructed on the basis of the 40 Mhz high frequency oscillator, the signal being for example divided by 4 to provide a 10 Mhz clock feeding these counters.

The example describes the use of one and the same clock 8 by the write interface circuit and the read interface circuit for the tagging of the data during their recording and the transferring of the data read over the 1394 bus. It would also be conceivable to envisage the implementation of the circuits on the basis of two separate clocks (oscillators), a tagging clock and a transfer clock. It is then necessary to take account of additional constraints relating to these clocks. Specifically, during the utilization of a common clock, only very good stability of the frequency is required, stability over time, with temperature etc. However, good precision is not indispensible since relative dating of one packet with respect to another is involved. In the case where two independent clocks are used, one for tagging and one for transfer, this relative dating depends also on the frequency deviation between the two clocks. Consequently, the precision of the clocks with respect to their nominal value must also be specified. The frequency of the second clock must for example be guaranteed inside the range within which the frequency of the clock for tagging may alter. It is also possible to specify very precise nominal frequencies for each of the clocks, for example to within 1 ppm and drifts of 15 ppm maximum for each of them.

This specification of the clock in terms of maximum drift of 15 ppm, gives a maximum deviation of 30 ppm between recording and reading, neglecting the deviations between the nominal frequencies in the case where two clocks are used. If, however, several successive storages of the data are envisaged, better precision is required, the error possibly accumulating with each stamping and hence with each recording. For example, a precision of the order of 1 ppm then allows some fifteen successive recordings.

The frequencies of operation of the clocks for tagging (also called recording clocks) and for transfer are such that the maximum deviation between these frequencies, proportionally speaking, is round about the tolerance in the system clock, specified at ±30 ppm in the MPEG2 standard. It was therefore previously assumed that the frequency of the system clock has a maximum drift of ±1 ppm, allowing a drift of ±30 ppm in the mean rate at the input of the decoder (reading of the PCR) corresponding to a drift of 15 ppm maximum for the tagging and transfer clocks.

In the case where one desires compatibility with any type of coder and hence by assuming a maximum drift of the system clock of ±30 ppm, the frequencies of the tagging and transfer clocks must not deviate by much more than 1 ppm. These are of course indicative values and operation will be all the better the closer one comes to these values.

Stated otherwise, the frequencies of operation of the tagging and transfer clocks are such that the maximum deviation between these frequencies, added to the maximum drift of the MPEG system clock, is, in proportion to the nominal values, of the order of or less than the drift of the system clock specified in the standard.

The data stream travelling over the 1394 bus is for example an MPTS (Multiple Program Transport Stream) transport stream comprising several programmes, such as defined in the MPEG 2 standard. The collection of programmes transported may then be recorded in the hard disk. It may also be an SPTS (Single Program Transport Stream) transport stream obtained by filtering the MPTS stream in the MPEG 2 decoder also called the "parsed" stream. The 188-byte packets are then received irregularly at the input of the 1394 interface and one then reasons in terms of mean rate. It is this program alone which is recorded in the hard disk.

FIG. 1 describes a 1394 link between a receiver and a recording device. The latter could equally well, without departing from the field of the invention, be incorporated into the receiver, the TS data then being transmitted directly to the hard disk interface circuit, without travelling via a 1394 bus and hence without passing through the LINK and PHI circuits for their recording.

The DV signals do not need such precision at the decoding level. Simply the device implemented for the MPEG type signals may also be used for the tagging of the DV packets for their recording and reading from the record carrier.

The invention claimed is:

1. Process for reading from a record carrier audio and video data coded in the form of packets according to the MPEG standard, for their transmission to a decoder by way of a bus, these packets having previously been recorded together with tags defining, on the basis of a tagging clock, instants of reception from the bus of the packets to be recorded, characterized in that it comprises:
    a step of reading the tags recorded together with the packets,
    a step of comparing the tags with values counted on the basis of a transfer clock for determining the instants of transfer on the bus of the data read from the record carrier,
    the frequency of operation of the transfer clock being such that the maximum deviation between the frequencies of the tagging clock and of the transfer clock, added to the maximum drift of the MPEG system clock, is, in proportion to the nominal values, of the order of or less than the drift of the system clock specified in the standard.

2. Process according to claim 1, characterized in that the tagging clock and the transfer clock are one and the same clock and in that the frequency of operation is such that its maximum drift, added to the maximum drift of the system clock is, in proportion to the nominal values, of the order of or less than the drift of the system clock specified in the standard divided by two.

3. Process according to claim 1, characterized in that the system clock has a tolerance of around ±1 ppm, the nominal frequency of the tagging and transfer clock a tolerance of around ±1 ppm and the drift of each clock lies in a range of ±15 ppm.

4. Process according to claim 2, characterized in that the system clock has a tolerance of around 1 ppm, in that the drift of the tagging and transfer clock lies in a range of ±15 ppm.

5. Process according to claim 1, characterized in that the data to be recorded originate from a 1394 bus.

6. Process according to claim 1, characterized in that the data to be recorded correspond to the TS stream originating directly from the receiver without travelling over a 1394 bus.

7. Process according to claim 1, characterized in that the data read are also data of DV and/or DSS type.

8. Process according to claim 3, characterized in that the drift is around 1 ppm so as to allow successive recording/reading operations.

9. Process for recording on and for reading from a record carrier audio and video data in the form of packets, coded according to the MPEG standard, for their transmission to a decoder by way of a bus, characterized in that it comprises:
    a step of tagging the packets on their reception from the bus, on the basis of a tagging clock, so as to define the instants of arrival of the data packets,
    a step of recording the packets received and the tags,
    a step of reading the tags and of comparing with values counted (9) on the basis of a transfer clock (8) so as to define the instants of transfer on the bus of the data read from the record carrier,
    the frequencies of operation of the said tagging and transfer clocks being such that the maximum deviation between these frequencies, added to the maximum drift of the MPEG system clock, is, in proportion to the nominal values, of the order of or less than the drift of the system clock specified in the standard.

10. Reading device for the implementation of the process according to claim 1 comprising a record carrier (10) and a reading interface circuit (9) for the reading and the transferring of the data from the record carrier to a bus, characterized in that it comprises at least one transfer clock (8) for transfering the data read, such that the maximum deviation between the frequencies of the tagging clock and of the transfer clock, added to the maximum drift of the MPEG system clock, is, in proportion to the nominal values, of the order of or less than the drift of the system clock specified in the standard.

11. Device according to claim 10, characterized in that the clock having served for the tagging and the transfer clock (8) are one and the same clock and in that its frequency of operation is such that its maximum drift, added to the maximum drift, of the system clock MPEG is, in proportion to the nominal values, of the order of or less than the drift of the system clock specified in the standard divided by two.

* * * * *

UNITED STATES PATENT AND TRADEMARK OFFICE
CERTIFICATE OF CORRECTION

PATENT NO. : 7,577,339 B2  Page 1 of 1
APPLICATION NO. : 10/332428
DATED : August 18, 2009
INVENTOR(S) : Defrance et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1745 days.

Signed and Sealed this

Seventh Day of September, 2010

David J. Kappos
*Director of the United States Patent and Trademark Office*